June 18, 1935.  A. MOORHOUSE  2,005,103
MOTOR VEHICLE
Filed Nov. 6, 1930  2 Sheets-Sheet 1
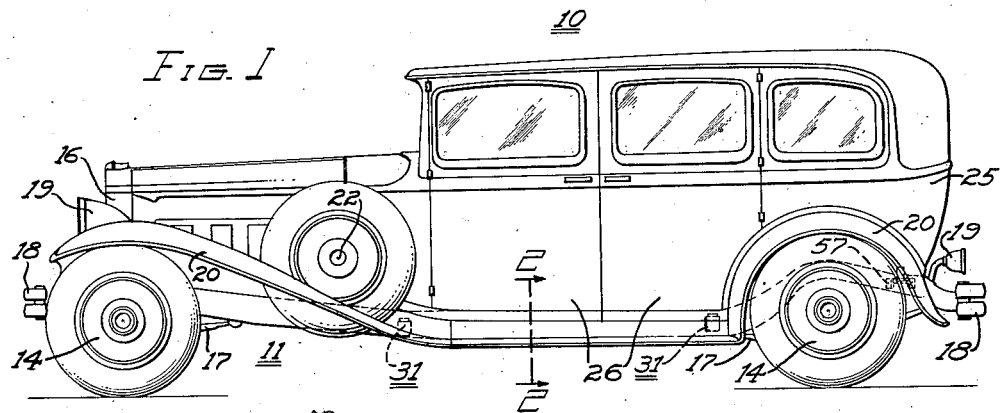
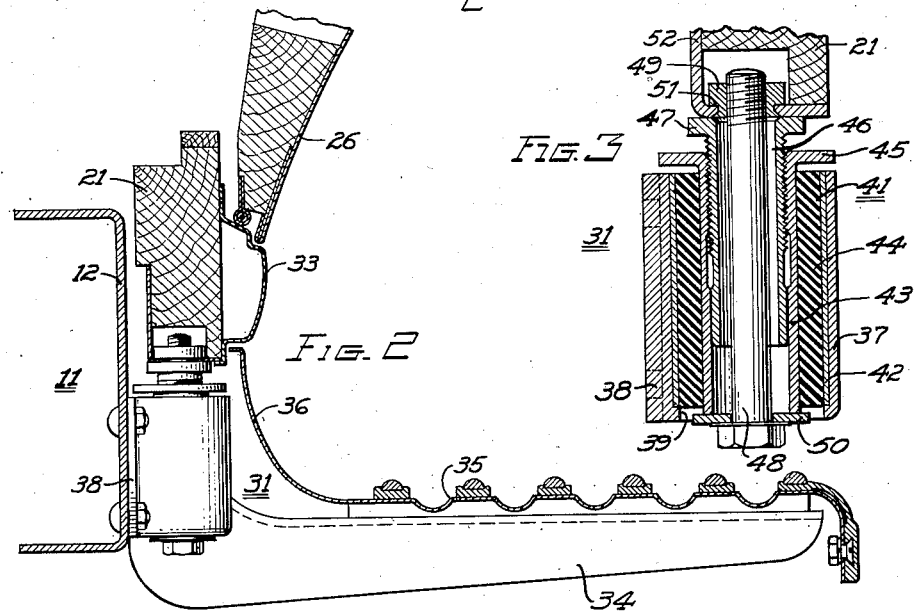
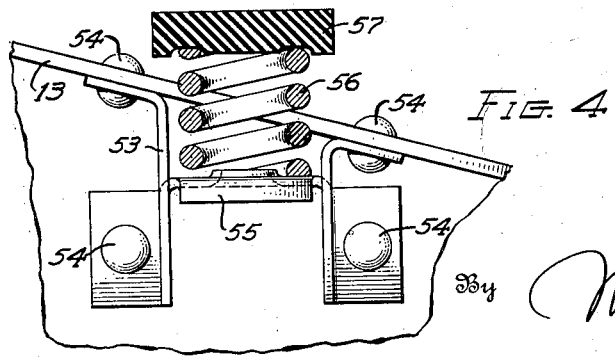
Inventor
ALFRED MOORHOUSE
By
Attorney

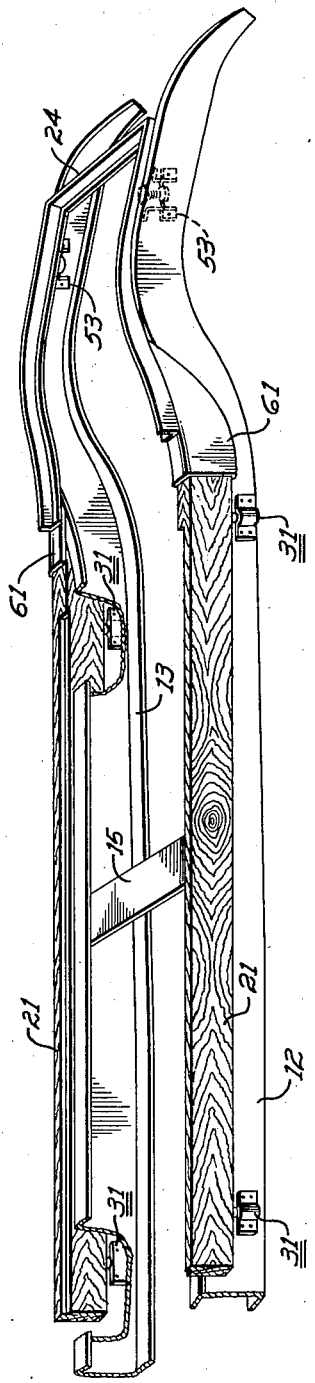

Patented June 18, 1935

2,005,103

UNITED STATES PATENT OFFICE 2,005,103

MOTOR VEHICLE

Alfred Moorhouse, Detroit, Mich., assignor to Packard Motor Car Company, Detroit, Mich., a corporation of Michigan Application November 6, 1930, Serial No. 493,735

11 Claims. (Cl. 296—35)

My invention relates to motor vehicles and has particular relation to the body and frame construction of such vehicles and means for joining these parts.

Hitherto in motor vehicle construction it has been the general practice to locate the sill members of the body above the frame. This resulted in a high body structure having relatively short panels and it was necessary to use dust shields to cover up the space between the body panels and the running boards. Sometimes resilient pads were placed between the sills and the frames but bolts were utilized in connecting the sills and the frames, consequently vibrations and other movements of the frame were readily transmitted to the body, resulting in noise and discomfort to the passengers, and even injury to the body. In addition the bolts prevented upward or horizontal movement of the body.

My invention is intended to overcome these difficulties and an object of my invention is to provide means for supporting a body with reference to a frame whereby weaving, wrenching, periodic vibration and other movements of the frame are not transmitted to the body.

Another object of my invention is to provide an improved vibration absorbing device for motor vehicles which shall permit movement of the body in all directions with reference to the frame, which is provided with vertically movable adjustment means to alter the spacing between the body and the frame, and other means to limit the extent of downward movement of the body, and which is removable and replaceable.

Another object of my invention is to provide a means whereby the body of a motor vehicle may be substantially lowered or the height of the body panels increased.

Another object of my invention is to provide an improved motor vehicle construction in which the dust shields customarily used are omitted.

Further features and objects of the invention will be apparent from the following description taken in connection with the accompanying drawings in which:

Figure 1 is a side elevational view of a motor vehicle utilizing my improved construction;

Fig. 2 is an enlarged view, partly in elevation and partly in section, of my vibration absorbing device as applied to a motor vehicle, the view being taken along the line 2—2 of Figure 1. Portions of the structure have been broken away to show the remaining portions in greater detail;

Fig. 3 is a view, partly in section and partly in elevation, of my improved vibration absorbing device;

Fig. 4 is a view partly in elevation and partly in section of another embodiment of my invention, and Fig. 5 is a view in perspective of a motor vehicle frame upon which the sills and frame work of a body have been mounted according to my invention.

While the invention will be described herein as applied to the supporting of a body of a motor vehicle with relation to the frame thereof, it will be appreciated that the invention is applicable in a number of instances where one body is to be fastened to another, and particularly where force is exerted between the bodies, and that the embodiments of the invention illustrated in the drawings may be modified if necessary for this purpose. The device, as applied to a motor vehicle, is a part of an improved motor vehicle construction as hereinafter described, which construction constitutes a part of my invention.

Referring more particularly to Figures 1 and 5 of the drawings, my device is here shown as it is used in a motor vehicle, which for the most part is of customary construction, for mounting the body 10 on the frame 11.

The frame of the vehicle, which extends the whole length of the body usually comprises a pair of channel members or side rails 12 and 13 placed in parallel extending relation with the flanges of the channels turned inwardly. Various cross-members 15 connect the two channels to constitute a rigid framework to act as a support for the radiator 16, motor (not shown) and body 10 of the vehicle.

Suitable brackets and connections are provided on the frame for attaching the supporting springs 17, steering gear (not shown), bumpers 18, lamps 19, fenders 20, tire racks 22 and other parts of the vehicle to the frame, the axles (not shown) of the vehicle are attached to the supporting springs 17 by suitable bolts in the usual manner and wheels 14 are rotatably mounted on the axles.

The box-like body framework is comprised of two sills 21, which extend in parallel relation to the frame, joined together by various cross members, of which the channel 24 is one, pillars (not shown) mounted in vertical positions on the sills and cross members and horizontally extending headers (not shown) connecting the pillars.

The body panels 25, which are preferably sheets of metal of suitable size and shape are secured to one another and to the frame as by welding, bolting or nailing. Doors 26, comprised of a rectangular framework to which door coverings or panels are fastened, are pivotally engaged in prepared openings in the body framework.

In order that the body may be associated with the frame in a lower plane than is customary with present commercial automobiles, I propose to construct the body so that the sills will be in a parallel horizontal plane with the frame side members and associated therewith by connections 31 which are secured to the frame and support the body.

With this arrangement of the body and frame the customary dust shield is not necessary and any space between the body and the running board may be closed by an ornamental moulding or covering 33 which is preferably attached to the body sills.

Brackets 34 are bolted or otherwise secured to the frame and constitute a supporting means for the running board 35 which is securely fastened to them. The running board is provided with an upwardly turned flange 36 adapted to terminate adjacent the lowest part of the body, in this case the moulding 33, to constitute a cover for the side wall of the frame.

The doors or other body panels engage the mouldings 33 and sills or body framing in the usual manner. It is to be noted, however, that the lower edge of the door is considerably lower with respect to the upper edge of the frame than is the usual practice.

A preferred form of the connecting means 31 is a vibration absorbing device adapted to permit universal and resiliently restrained movement of the body in all directions. The device includes a cylinder 37 provided with flanges 38 by means of which it is bolted or otherwise attached to the frame 11. The cylinder is hollow and is provided with a flange 39 at its lower inside wall adapted to support a cylindrical vibration absorbing unit 41 therein. The vibration absorbing unit itself, in this embodiment of the invention, is comprised of two nested, spaced sleeves 42 and 43 and a rubber insert or sleeve 44 located between the spaced sleeves. The outer sleeve 42 is fitted within the cylinder 37 and tightly engages the inner walls thereof preferably with a pressed fit. The rubber sleeve is vulcanized to the inner wall of the outer sleeve 42 and the outer wall of the inner sleeve 43.

The inner sleeve 43 is preferably provided with an annular flange 45 which projects out over the nested sleeves to strike the cylinder 37 and act as a stop if the inner sleeve is driven downwardly to any considerable extent as, for instance, when the vehicle strikes a bump in the roadway.

The inner sleeve 43 of the unit is threaded on its inner wall to provide means for engaging the unit on a sleeve or thimble 46 which is provided with a flange 47 to act as a support for the sill 21. The inner sleeve 43 and the thimble 46 are locked with respect to each other and the body sleeve is engaged to the thimble by means of the bolt 48 and nut 49. The bolt 48 is engaged on the lower end of the inner sleeve 43 by means of a washer 50 and the bolt projects through the sleeve and thimble into the sill. The nut 49 is provided with a flange 51 for engaging a suitable channeled portion 52 of the sill 21 and the nut is caused to draw the channeled portion of the sill down on the flange of the thimble by tightening the bolt. The threaded connection of the thimble and the inner sleeve permits vertical adjustment of the thimble to vary the spacing between the body and frame. The bolt 48, thimble 46 and sleeve 43 may be termed the plunger structure and it is apparent that this structure may be considerably modified, as desired, without such a change of function as to be beyond the scope and spirit of the invention.

Another embodiment of my vibration absorbing device is in the form of a bracket 53 which is adapted to project inwardly from the frame side rail and to be fastened to the side wall and upper flange thereof by means of rivets 54 or the like. A seat 55, having an up-thrust center portion, is provided for the coiled spring 56 and a resilient pad 57 may be mounted on top of the coil spring and in contact with a portion of the body frame work.

In supporting a body with reference to the frame by means of my device I preferably employ two of the vibration absorbing devices shown in Figures 1 to 3, on each side of the frame, at opposite ends of the sills. In the usual body construction the back portion of the body is supported with reference to the sills by means of channel members 61 which engage the sills and to which angle iron members 24 are fastened as by welding or the like.

This last described body construction is preferably of sufficient rigidity to be almost entirely self-supporting, but I preferably provide one of the vibration absorbing devices shown in Figure 4 on each frame member to the rear of the vehicle, arranged to afford an auxiliary support for the rear portion of the body.

The body, for the greater part, is supported by means of the four shock absorbing devices shown in Figure 3 in order to provide a plurality of supporting points located relatively close together so that wrenching and weaving of the frame is not transmitted to the sills.

It is apparent that my construction results in a much lower body or may be employed to permit greater height of the body panels without increasing the overall height of the vehicle. It is apparent that the vibration absorbing device may be readily adjusted to bear equal parts of the weight of the body, and that the units may be readily replaced if desired.

It is apparent also that modifications may be made by those skilled in the art. For instance, the relation of the parts of the vibration absorbing device may be reversed in their position on the sills and frame, or the device may be employed in a different relation with respect to the frame and body. These and other modifications may be made by those skilled in the art without departing from the spirit and scope of the invention as set forth in the appended claims.

Having thus described my invention what I claim as new and desire to secure by Letters Patent is:

1. In a device for resiliently engaging one body with reference to another, a cylinder on one body, a supporting member engaged with the other body telescopically associated with the cylinder, and a cylindrical vibration-absorbing unit removably engaged in the cylinder and having screw-threaded engagement with the supporting member, the adjustment of said member regulating the vertical position of the supported body relative to the other body.

2. In a device for resiliently engaging one body with reference to another, a cylinder on one body, a supporting member engaged with the other body, and a vibration-absorbing unit comprising a sleeve having removable engagement within the cylinder, a second sleeve having screw threaded engagement with the supporting member and a rubber sleeve disposed between the first and second named sleeves and vulcanized to the walls thereof, the adjustment of said member in the second sleeve varying the vertical position of the supported body relative to the other body.

3. In a device for resiliently engaging the body sill of a motor vehicle to the frame, a supporting member on the body sill comprising a thimble upon which the body sill rests, a sleeve provided with an annular flange to act as a stop threaded partly on the thimble, said sleeve being resiliently supported on the frame, a bolt engaging the lower end of the sleeve passing through the sleeve and thimble, and a nut, engaged with the body sill, threaded on the bolt, whereby the bolt holds the body sill against the first sleeve and locks the two sleeves with respect to each other.

4. In a device for resiliently engaging the body sill of a motor vehicle to the frame, a cylinder on the frame, a supporting member on the body sill comprising a thimble upon which the body sill rests, a sleeve provided with an annular flange to act as a stop threaded partly on the thimble, a bolt engaging the lower end of the sleeve passed through the sleeve and thimble, a nut engaged with the body sill, threaded on the bolt, a second sleeve removably engaged within the cylinder, and a rubber sleeve vulcanized to the inner wall of the second sleeve and to the outer wall of the first sleeve.

5. Supporting means for resiliently engaging one body with reference to another body comprising a mounting fixed to one of the bodies, a vibration-absorbing unit carried in the mounting, a supporting member for the other body telescopically associated with the unit, said supporting member being carried by and axially adjustable in the vibration-absorbing unit, and means securing the supported body on the member.

6. Supporting means for resiliently engaging one body with reference to another comprising a mounting fixed to one of the bodies, a vibration-absorbing unit carried in the mounting, a supporting member for the other body telescopically associated with the unit, said supporting member being carried by and axially adjustable relative to the vibration-absorbing unit, and detachable adjustable means engaging the unit and the supported body to clamp the supported body to the member.

7. A support comprising a cylinder having an inturned flange, a vibration absorbing unit slidably fitted into the cylinder, said unit comprising a pair of spaced sleeves and an intermediate rubber sleeve vulcanized thereto, the outer sleeve resting on the inturned flange of said cylinder, and a supporting member telescoping within the inner sleeve of said unit and adjustably secured axially thereto.

8. Support means for an upper and lower body comprising a hollow cylinder having an inturned flange, a vibration absorbing unit slidably fitted into the cylinder, said unit comprising a pair of spaced sleeves and an intermediate rubber sleeve vulcanized thereto, the outer sleeve resting on the inturned flange of said cylinder, a support member telescoping within the inner sleeve of said unit and engaging the upper body, and means engaging said inner sleeve of the unit and the upper body to clamp the supporting member to the upper body.

9. In a device for resiliently connecting the body sill member of a motor vehicle to a frame side member, a sleeve connected with one of said members, a rubber sleeve bonded to said first sleeve, a third sleeve bonded to said rubber sleeve and a support connected to the other of said members and to the third sleeve and adjustable with relation to said third sleeve axially of the same.

10. In a device for resiliently connecting the body sill member of a motor vehicle to a frame side member, a sleeve connected with one of said members, a rubber sleeve bonded to said first sleeve, a third sleeve bonded to said rubber sleeve and a support connected to the other of said members and having a screw connection with the third sleeve whereby the support may be adjusted with relation to the third sleeve axially of the same.

11. In a device for resiliently connecting the body sill member of a motor vehicle to a frame side member, a sleeve connected with one of said members, a rubber sleeve bonded to said first sleeve, a third sleeve bonded to said rubber sleeve, a support connected to the other of said members and to the third sleeve and adjustable with relation to said third sleeve axially of the same and common means for securing the latter member to said support and for locking the support to the third sleeve.

ALFRED MOORHOUSE.